Patented Apr. 13, 1943

2,316,187

UNITED STATES PATENT OFFICE 2,316,187

POLYMERIZATION OF OITICICA OIL

Malcolm F. Pratt and Henry G. Berger, Woodbury, N. J., assignors to Socony-Vacuum Oil Company, Incorporated, New York, N. Y., a corporation of New York No Drawing. Application September 6, 1940, Serial No. 355,603

4 Claims. (Cl. 260—407)

This invention relates to the polymerization of oiticica oil for the manufacture of liquid coating compositions such as varnishes and the like.

As is well known, China wood oil or tung oil is the most widely used quick drying oil in the paint and varnish industry and has been largely responsible for the development of so many fast drying coating compositions. During recent years the supply of tung oil for the United States has been quite unsettled and increasingly limited. For this reason considerable investigation and research is being directed towards the development of a substitute for tung oil.

Among the products that have been mentioned and used as a substitute for tung oil is oiticica oil, an oil crushed from the seed of a tree, *Licinia rigida*, which grows in northern Brazil. Although oiticica oil closely resembles tung oil both in chemical constitution and behavior, minor differences make it impossible to prepare by conventional cooking treated oiticica oils and varnishes that possess as rapid drying properties and as great a degree of water resistance as do comparable tung oil products. Thus if oiticica oil alone is cooked at a sufficiently high temperature long enough to overcome completely the frosting tendency of the raw oil, or if it is cooked with such resins as ester gum at conventional varnish cooking temperatures, say 550° F., to develop the normal body of a typical varnish, the resulting products have somewhat poorer drying qualities than similar tung oil products, and, further, the resistance to water is less as evidenced by an increased whitening when dried films of the products are soaked in water.

It is an object of this invention to provide a process of polymerizing oiticica oil which permits such oil to be used as a substantially full equivalent of tung oil in liquid coating compositions such as varnishes and the like. Another object is to manufacture treated oiticica oil products which cannot be prepared by heat treating alone. Still another object is to provide a process of treating products containing oiticica oil and a substantial amount of a slower drying oil, such as linseed oil, perilla oil, etc., that substantially reduces the time of cooking such mixtures and decreases the drying time of the treated product over that of a similar mixture treated with heat alone.

Our invention comprises effecting the necessary polymerization of the oiticica oil which is desired for the particular liquid coating composition being manufactured by means of a combination heat treatment and catalytic treatment whereby a polymerization catalyst, boron trifluoride, brings about a part of the polymerization normally accomplished by heat. Although there is a marked physical resemblance between the action of small percentages of boron trifluoride on oiticica oil and that of heat, we have found that a certain balance must be maintained between heat treatment on the one hand and catalytic treatment on the other hand, if a clear, lustrous and rapid drying film is to be obtained.

As pointed out above, oiticica oil is a rapid drying oil but the untreated oil dries with a frosted film. Yet if the oil is heat treated at conventional cooking temperatures, 500° to 600° F., long enough to remove frosting tendencies by heat alone then the fast drying property of the oil is appreciably impaired.

Since oiticica oil, like other drying oils, is an unsaturated compound it might be expected that polymerization catalysts would bring about some kind of polymerization of the oil, especially since it is known (e. g. Eichwald Patent 2,127,811) that polymerization catalysts, as for example, boron trifluoride, will polymerize the slow drying oils and even the semi-drying oils to polymers suitable for lubrication. In our work we found that as little as 0.5% of boron trifluoride will transform raw oiticica oil at room temperature into a stiff gel within a few minutes. We also found that amounts less than 0.5% would produce at room temperatures, and at temperatures up to about 300° F., thickened oils physically similar to heat bodied oils, but such catalytically treated oils dry to give a frosted film.

However, we have made the discovery that if oiticica oil is cooked at temperatures above about 300° F., and preferably above about 400° F., in the presence of small amounts of boron trifluoride as a polymerization catalyst whereby part of the polymerization is brought about by heat and part is brought about by the catalyst, the oil can be properly thickened or compounded with removal of frosting tendencies (i. e., it is gas proof) without appreciably impairing the quick drying quality of the oil, and a dried film of the treated oil is highly water resistant.

While we do not wish to be held to any particular theory, it is probable that oiticica oil is less thermally stable than tung oil. Therefore, when the oiticica oil is heated at sufficiently high temperatures for a sufficient length of time to remove frosting tendencies and produce the desired thickening or compounding, by heat alone, the oil is somewhat converted so that its quick drying property is partly removed. But in our process a catalyst effects part of the processing to gasproof and thicken the oil so that the length of heating at the required high cooking temperatures is shorter, and, as a result, the oil is not converted in such a way as to lose its quick drying property.

While the amount of catalyst required to be used will always be quite small, it is rather difficult to specify the optimum amount for every operation. This is true because the amount may vary somewhat with the cooking temperature, the length of cooking, the amount of thickening or compounding desired, whether the oil is being cooked alone or with resins or other oils, etc. However, in all of our operations an amount less than about 1.5% of the oil has given satisfactory results, and when oiticica oil is being processed alone fractional amounts which are less than 0.5% have proven adequate.

As stated, the temperature of cooking should be above about 300° F. and preferably above about 400° F., the upper temperature limit being set by the upper temperature that may be used when treating with heat alone. Like tung oil, oiticica oil will gel when heated at high temperatures for a given period of time. Accordingly gel formation must be avoided as is known by the art. Gel formation is particularly troublesome when continuous processing is attempted. However, continuous processes which avoid gel difficulties are disclosed by Reece Re. 19,307 and also by the co-pending application of Pratt et al. S. N. 258,410, filed February 25, 1940. Further, oiticica oil, like tung oil, may be heated above its gelling temperatures for a given length of time to produce non-drying oils. Accordingly, with one exception, these latter high temperatures which are above the maximum gelling temperature should be avoided, as is obvious. The one exception is when the abovementioned Pratt et al. continuous process is being used wherein the oil is heated for a brief period at such high non-gelling temperatures while well agitated and then is brought down to normally gelling temperatures to soak, soaking at normally gelling temperatures then being permissible as gelling tendencies, but not quick drying qualities, have been removed.

Therefore, it is to be understood that oiticica oil may be bodied by our heat-catalytic process in either a batch procedure or by a continuous procedure. Since the catalyst reduces the time of cooking, its use is particularly advantageous in a continuous operation as a substantial reduction in the amount of apparatus required to handle the moving oil is permitted. A slight excess of catalyst is used in the continuous procedure over that used in batch procedure to compensate for the shorter reaction time which it affords. Either procedure gives a superior product to any that can be produced by heat alone.

Not only is our treated oil substantially faster drying (dries dust free in about 1 hour and tack free in about 2 hours) but the films of such treated oils are also stronger and more water resistant than films of oil that have been bodied by heat alone, in fact, our bodied oil dries rapidly to an unusually hard film that is really more like a varnish than a bodied oil.

Oiticica oil which has been bodied by our heat-catalytic process may be blended with ester gum, for instance, by merely warming above the melting point of the resin to produce a varnish that compares favorably with a normal tung oil-ester gum varnish in drying property, water resistance and durability. For example, such a varnish at 25 gallon length has drying times of dust free 1¼ hours, tack free 2¾ hours and hard 4 hours.

Our invention at present appears to be of primary importance for treating oiticica oil alone since products are produced thereby that cannot be produced solely by heating. However, we have carried out considerable work on polymerizing mixtures of oiticica oil with substantial amounts of slow drying oils such as linseed, perilla and soya bean oils. While the outstanding products resulting from our treating oiticica oil alone are not obtained, we do obtain in each case where a substantial amount, say 50% or more, of oiticica oil is present a substantially reduced cooking time and a somewhat improved drying time over that produced by heat alone. These improvements are not obtained by treating the slow drying oils alone.

The following examples are given for purposes of further illustrating the invention. However, it is to be understood the invention is not to be limited by the examples as there may be substantial variations without departing from the scope of the invention:

*Example I*

300 parts by weight of raw oiticica oil are heated to 400° F. at which time the catalyst, boron trifluoride, is introduced in vapor form at the rate of .0034% per minute until .05% BF₃ has been added. The oil is then cooked at the 400° F. temperature for 10 minutes more, making a total cooking time of 25 minutes. The oil is stirred throughout the heating operation. Upon completing the cooking the oil is poured into 200 parts by weight of mineral spirits. The finished product has a body H, Gardner-Holdt scale.

After the addition of metallic naphthenate driers, 0.5% lead, 0.035% manganese and 0.05% cobalt based on the non-volatile content, the oil dries rapidly to a hard, clear and lustrous film that is water resistant.

The above treated oil was blended with ester gum to give a 25 gallon length varnish having 50% non-volatile, and such varnish is comparable in drying time, hardness and water resistance to an equal length tung oil-ester gum varnish.

*Example II*

In this example the oil is treated in continuous procedure using an apparatus similar to that described in Pratt et al. application S. N. 258,410, that is, the oil is first passed through a primary heater where it is briefly heated above its gelation temperatures while well agitated and then is sent through a soaking zone at normally gelling temperatures.

The raw oiticica oil is fed into the primary heater and treated there briefly at 650° F. The oil then passes to a soaking zone where it is heated at 400° F. for a sufficient length of time to give the desired body to the oil. Boron trifluoride is introduced in vapor form into the oil in the soaking zone at such a rate as to give 0.12% BF₃ in the finished product. In order to cool the oil quickly it is drawn off from the soaking zone into mineral spirits.

After the addition of metallic naphthenate driers, such as added to the oil in Example I, the oil dries to a hard, clear and lustrous film which is water resistant in about 2½ hours.

The treated oil is blended with ester gum to make a varnish of 25 gallon length (⅓ resin and ⅔ oil) by heating just above the melting point of the resin, stirring in resin and then reducing with mineral spirits to 50% non-volatile, and such varnish has body D—E, Gardner-Holdt scale, and is comparable in drying characteristics, hardness and water resistance to an equal length tung oil varnish manufactured in the conventional manner. The varnish is considerably more water resistant and faster drying than varnishes produced by substituting oiticica oil for tung oil in the conventional varnish cooking procedures for ester gum varnishes using heat alone.

Although the production of the treated oil continuously in one operation, as described above, is preferred, substantially the same end product may be made by entirely separating the heat treatment in the primary heater and the subsequent catalytic treatment. In such an event the oil coming from the primary heater is cooled and collected. Then at any time subsequently such heat treated oil is polymerized catalytically by a batch procedure.

We claim:

1. The process of polymerizing oiticica oil to produce a non-frosting, quick drying product, which comprises cooking the oil at a temperature above about 300° F. in the presence of a small amount of boron trifluoride as a polymerization catalyst.

2. The process of polymerizing oiticica oil to produce a non-frosting, quick drying product, which comprises cooking the oil at a temperature above about 400° F. in the presence of a small amount of boron trifluoride as a polymerization catalyst.

3. The process of claim 2 wherein the amount of boron trifluoride is less than about 0.5% of the oil.

4. In a process of cooking a product containing a substantial amount of oiticica oil for the manufacture of a quick drying liquid coating composition, the improvement which comprises carrying out the cooking at a temperature above about 300° F. and in the presence of a small amount of boron trifluoride as a polymerization catalyst.

MALCOLM F. PRATT.
HENRY G. BERGER.